March 19, 1935. W. A. DARRAH 1,994,755
DEVICE FOR CONTROLLING SPECIFIC GRAVITY OF A GAS MIXTURE
Filed March 15, 1928
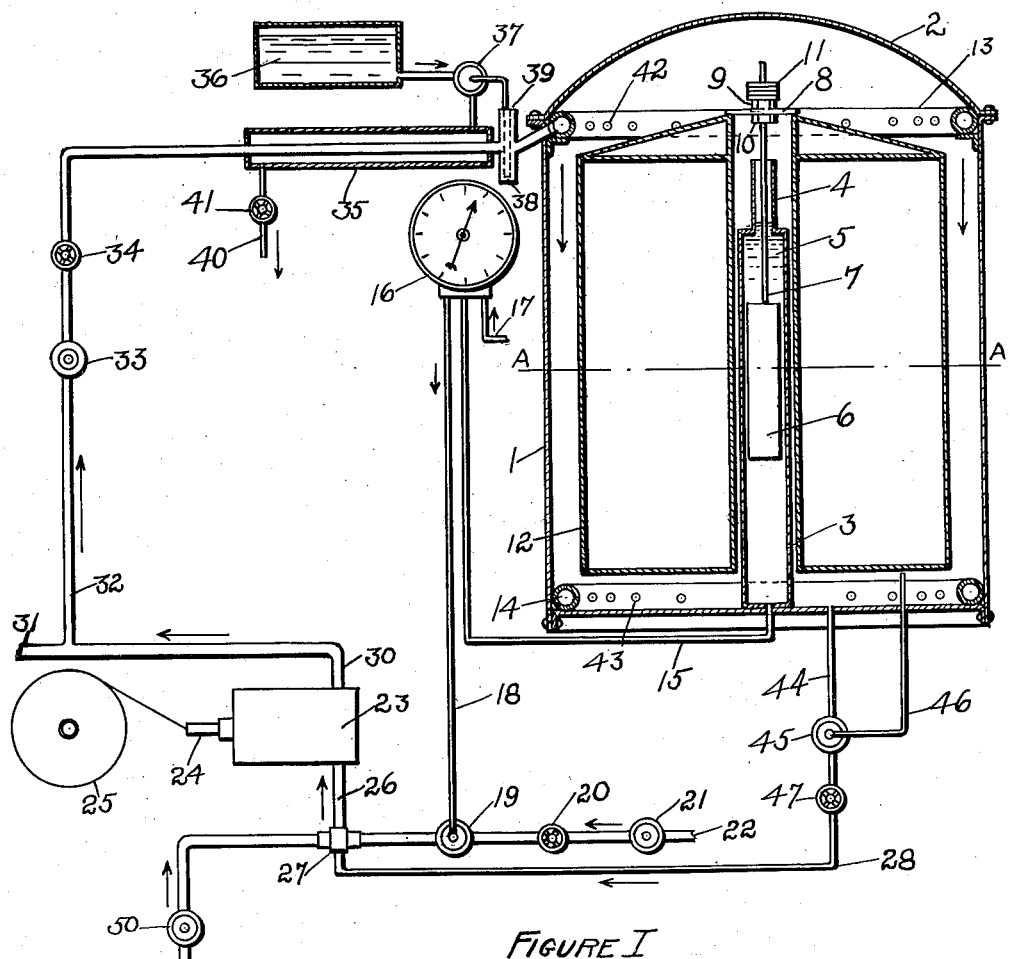
FIGURE I
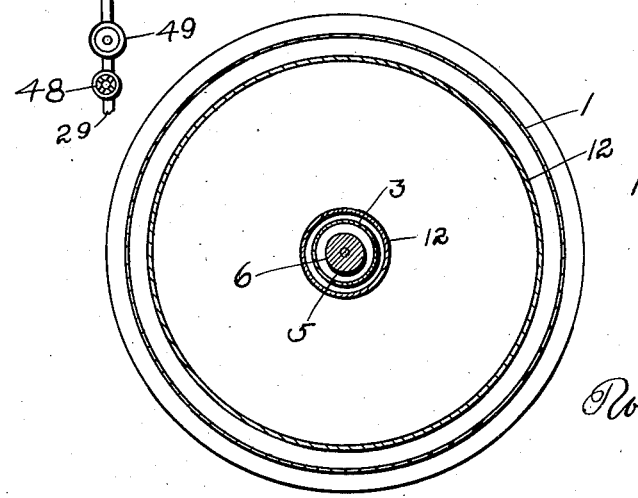
FIGURE II
William A. Darrah,
INVENTOR.

Patented Mar. 19, 1935

1,994,755

UNITED STATES PATENT OFFICE 1,994,755

DEVICE FOR CONTROLLING SPECIFIC GRAVITY OF A GAS MIXTURE

William A. Darrah, Chicago, Ill.

Application March 15, 1928, Serial No. 262,013

2 Claims. (Cl. 48—183)

This invention relates to equipment and processes for controlling the specific gravity of fluids. It may be used on either liquids or gases but one of the important applications is in connection with the treatment of fuel gases where slight variations in specific gravity often cause serious results in connection with the burners or other equipment. One of the objects of this invention is to provide means for automatically mixing varying proportions of two or more gases or liquids intended for various uses such as for combustion in order to obtain a mixture of constant specific gravity. Other objects of this invention will be apparent from the description, drawing and claims appended hereto.

While it should be understood that this equipment may be used in connection with liquids such as water solutions, oil solutions, etc., one of its important applications is in connection with gases and particularly fuel gases. The description which follows will, for the sake of clearness, be based upon the application of this equipment to fuel gases, but obvious modifications will adapt this equipment to many other purposes.

In the drawing:

Fig. I shows a schematic arrangement of one form of my invention portions of the diagram being shown in vertical section, Fig. II is a horizontal section of one portion of my invention taken along the line A—A.

Referring to the drawing 1 represents a tank or container which may be of any desired shape, but for purposes of convenience I have indicated it as of cylindrical form and provided with a removable cover member 2 which is capable of being tightly attached to shell 1. Within shell 1, I have supported a container 3 which for convenience of design I have shown placed centrally within shell 1. Container 3 is provided with a neck 4 at its upper end and is designed to be filled with a liquid such as oil or mercury indicated by 5. A float 6 which may be made of any desired material such as steel is shown submerged in liquid 5 and carries at its upper portion a stem 7 which in turn supports plate 8 by nuts 9 and 10. Additional adjusting weights are indicated at 11. A cylindrical float member 12 is attached to stem 7. Float member 12 may be made in any desired form but for convenience I prefer a cylindrical shape with a cylindrical hole arranged in the center. The float may be made of metal such as brass or copper and should preferably be tight and free from openings. It is intended that float 12 which is submitted to the action of the fluid whose specific gravity is being controlled should be light and should be counter-balanced by the upward thrust of liquid 5 on float member 6. A leading-in pipe 13 is connected to the source of fluid to be controlled and a discharge pipe 14 serves to remove the fluid after passing through the container 1. The liquid 5 in container 3 is connected by pipe 15 to pressure controller 16. An actuating fluid such as compressed air is delivered by pipe 17 to controller 16 and passes out from controller 16 by means of duct 18 to pressure actuated valve 19 which is in series with hand valve 20 and check valve 21 all located in line 22 which may be connected to one source of fluid which it is desired to mix. This fluid may be air, products of combustion, other fuel gases or any desired material.

23 indicates diagrammatically the pump or compressor, while 24 shows diagrammatically the piston of pump 23 and 25 indicates the fly wheel or other actuating device. The compressor as such constitutes no part of this invention and any commercial form of pump or compressor or blower may be used. The intake of compressor 23 is indicated at 26 connecting through T member 27 to pipe 22 and pipes 28 and 29. The discharge from compressor 23 passes through pipe 30 and out end 31 to the furnace, not shown, or other application for the controlled fluid. Branch 32 may be called a sampling tube or branch and serves to continuously supply a small regulated portion of the discharged fluid from compressor 23. This sample portion of fluid passing through pipe 32 is controlled by pressure reducing valve 33 so arranged as to limit the flow to such a quantity as to hold a controlled and constant pressure in container 1. 34 is a hand control valve which may be used in place of or in addition to valve 33. A temperature regulator 35 is placed between pipe 32 and container 1 and is designed to hold constant at all times the temperature of the fluid entering container 1. Obviously the size, shape and design of temperature controller 35 may be varied to suit conditions and its exact construction or design constitutes no part of my invention. For purposes of clearness I have shown a water tank 36 arranged to deliver water to cooler 35 through thermostat valve 37 which is actuated by thermostat member 38 placed in well 39 and thereby subjected to the flow of fluid from pipe 32 after leaving cooler 35. The exhaust water from cooler 35 passes through pipe 40 and may if desired be controlled by hand valve 41. The fluid entering container 1 after passing through cooler 35 travels through distributing pipe 13 and leaves through distributing holes 42. The fluid then passes around float 12 and into collecting pipe 14 by means of a series of distributing holes 43. The fluid after passing through container 1 and entering collecting pipe 14 leaves by pipe 44 passing through regulator 45 which is controlled automatically by the pressure within container 1 acting through pipe 46.

A hand valve 47 also controls the flow of fluid through pipe 44 and back through pipe 28 into T 27. A second fluid which may be mixed with the first fluid is arranged to enter through pipe 29. The flow of fluid through pipe 29 may be controlled by hand valve 48, pressure regulating valve 49 and check valve 50.

In operation and particularly as applied to a fuel gas system, pump or compressor 23 draws a supply of gas from any given source such as a gas main connected to pipe 29. The gas is held at a constant controlled pressure by valve 49 and is prevented from passing backward into the main by check valve 50 in case the compressor is suddenly stopped or there should be any leakage through the compressor. On leaving compressor 23 the gas passes through pipes 30 and 31 to the furnace or other application. A small sample is continuously drawn off from pipe 31 through sampling bypass 32. The sample is held at a constant and frequently reduced pressure such as exactly atmospheric by regulating valve 33 and is cooled by cooler 35 to a constant temperature such as 60° F. It should be understood that any commercial pressure or temperature may be employed and I am merely mentioning specific conditions for purposes of clearness. As the sample of gas enters distributing pipe 13 it passes around float member 12 in an orderly uniform flow. The distributor also serves to prevent the velocity of the gas in passing through container 1 from exerting disturbing effects on float 12.

The gas after passing through sampling device enclosed in container 1 returns through regulating valve 45, which holds a constant pressure within container 1 back into the intake 23 of the compressor. It is therefore not lost.

Assuming that the float 12 is suspended in a balanced condition by means of the adjacent weights 11 in which any specific gravity of the surrounding medium will cause float 12 to rise or fall depending on whether the specific gravity of the surrounding medium is increased or decreased. If float 12 falls due to a decrease in specific gravity of the surrounding medium, stem member 7 will pass further into tube member 4 displacing additional supporting liquid 5 and therefore causing the level of liquid 5 to rise in tube 4. Such a rise in level of liquid in tube 4 will increase the pressure due to the head of liquid on pressure controller 16. This controller may be any of a number of standard commercial tubes now on the market and does not in its details of construction constitute a part of this invention.

It should be understood that I am merely utilizing the pressure controller 16 as a means of causing movements of float 12 to actuate the control mechanism later to be described and any other obvious mechanism such as a series of levers would still come within the scope of this invention.

Pressure controller 16 is of such a type that as the pressure increases compressed air is allowed to pass from pipe 17 into pipe 18 which in turn actuates automatic valve 19 causing it to open. When valve 19 opens it permits the intake pipe 26 of compressor 23 to draw a portion of fluid through the pipe 22. The fluid drawn through pipe 22 on actuation of valve 19 is mixed with the fluid entering compressor 23 through pipe 29. The mixture is passed out through pipe 30 to the apparatus located at the end of pipe 31. If pipe 22 is connected to a fluid heavier than that supplied by pipe 29 the specific gravity of the mixture will be increased, and the degree of increase in this specific gravity will of course depend upon the quantity of heavier fluid supplied through pipe 22. The sample of fluid now taken through pipe 32 will be increased in specific gravity and thus when the sample of the mixture passes through container 1 the higher specific gravity will cause float 12 to rise which in turn will reduce the fluid pressure on controller 16 and in turn reduce the opening in automatic valve 19.

It will be evident, therefore, that the apparatus is automatic and self compensating.

Check valve 21 is provided to prevent any back flow of fluids in pipe 22.

If desired I may supply artificial or city gas to pipe 29 and natural or by product coke oven gas to pipe 22. I may, on the other hand, connect water gas to pipe 22 and hydrogen to pipe 29. I may connect a source of coal gas or city gas to pipe 29 and I may use air, carbon dioxide or products of combustion in pipe 22. Various other applications will be apparent.

It should be understood that this invention is not confined to the exact size, type or details of equipment shown. The use of counter-balanced floats is highly advantageous in that friction is reduced to a minimum which makes the equipment very sensitive and quick to respond. On the other hand, a series of levers carried on knife edges may be utilized to actuate valve 19 directly, or the the movement of float 12 may be used to close an electric contact which will close a circuit actuating valve 19 directly and various other modifications are evident.

Having now fully described my invention what I claim as new and wish to secure by Letters Patent in the United States is as follows:

1. A device for controlling the specific gravity of a gas mixture comprising, mixing means, gas conduits leading to said mixing means, a float chamber, a conduit for leading a sample of mixed gases discharged from the mixing means to the float chamber, a float within the float chamber, a liquid receptacle concentric with the float, a second float carried by and concentric with the first-mentioned float and adapted to be supported by liquid in the said liquid receptacle, means responsive to variations of the liquid level in said liquid receptacle, and valve means in one of the gas conduits actuated by the last-mentioned means whereby variations in specific gravity from a preselected value are corrected.

2. A device for controlling the specific gravity of a gas mixture comprising, mixing means, gas conduits leading to said mixing means, a float chamber, a conduit for leading a sample of mixed gases discharged from the mixing means to the float chamber, a float within the float chamber, a liquid receptacle cooperating with the float, a second float carried by and cooperating with the first-mentioned float and adapted to be supported by liquid in the said liquid receptacle, means responsive to variations of the liquid level in said liquid receptacle, and valve means in one of the gas conduits actuated by the last-mentioned means whereby variations in specific gravity from a preselected value are corrected.

WILLIAM A. DARRAH.